(12) United States Patent
Schweinberger et al.

(10) Patent No.: US 10,357,873 B2
(45) Date of Patent: Jul. 23, 2019

(54) PORTABLE, HANDHELD TOOL HAVING A FLOOR PLATE

(75) Inventors: Henning Schweinberger, Hamburg (DE); Klaus Scholz, Hamburg (DE)

(73) Assignee: MAKITA CORPORATION, Anjo-shi (JP)

( * ) Notice: Subject to any disclaimer, the term of this patent is extended or adjusted under 35 U.S.C. 154(b) by 1054 days.

(21) Appl. No.: 12/662,690

(22) Filed: Apr. 28, 2010

(65) Prior Publication Data

US 2010/0288907 A1  Nov. 18, 2010

(30) Foreign Application Priority Data

May 12, 2009 (DE) .................... 20 2009 006 860 U

(51) Int. Cl.
*B23D 45/16* (2006.01)
*B25F 5/02* (2006.01)
(Continued)

(52) U.S. Cl.
CPC ................ *B25F 5/02* (2013.01); *B23D 45/16* (2013.01); *B23D 47/02* (2013.01); *B23D 59/006* (2013.01); *B23Q 11/0042* (2013.01); *B27B 9/00* (2013.01); *B27B 17/00* (2013.01); *B28D 1/04* (2013.01); *B28D 1/08* (2013.01); *Y10T 83/2209* (2015.04); *Y10T 83/2218* (2015.04)

(58) Field of Classification Search
CPC ... B25F 5/02; B25F 5/021; B25F 5/11; B23D 45/00; B23D 45/16; B23D 47/02; B23D 59/006; B27B 5/29; B27B 9/00; B27B 17/00; B27B 17/02; B27B 17/025; B27B 17/04; B28D 1/04; B28D 1/08; B28D 1/082; B28D 7/02; B23Q 11/0042; B23Q 11/0053; Y10T 83/207; Y10T 83/2209; Y10T 83/2211; Y10T 83/2213; Y10T 83/2216; Y10T 83/2218; Y10T 83/222; Y10T 83/95; Y10T 83/96
(Continued)

(56) References Cited

U.S. PATENT DOCUMENTS 4,266,515 A    5/1981  Bross
5,015,900 A *  5/1991  Morrill ........................... 310/91
(Continued)

FOREIGN PATENT DOCUMENTS

DE    28 06 107 A1    8/1979
DE    32 42 943 A1    5/1984
(Continued)

OTHER PUBLICATIONS

German Search Report dated Jun. 7, 2010 in German Patent Application No. 20 2009 006 860.9 (with translation).
Sep. 8, 2014 Decision on Grant issued in Russian Application No. 2010119047.
Dec. 18, 2015 Office Action issued in European Application 10 005 036.8.

*Primary Examiner* — Clark F Dexter
(74) *Attorney, Agent, or Firm* — Oliff PLC

(57) ABSTRACT

The invention relates to a floor plate, in particular for portable, handheld tools with a combustion engine, an essentially flat surface with an continuous outer edge and at least one first opening with a related edge and a second opening with a related edge, wherein the at least one edge of an opening exhibits an element that projects at an inclined angle, which serves as a baffle plate to divert sparks and particles, and further that at least the continuous edge of the floor plate and/or the edge of at least one opening are at least sectionally beaded or pulled up.

10 Claims, 3 Drawing Sheets

(51) Int. Cl.
    *B27B 9/00*           (2006.01)
    *B27B 17/00*         (2006.01)
    *B28D 1/04*          (2006.01)
    *B28D 1/08*          (2006.01)
    *B23D 59/00*         (2006.01)
    *B23Q 11/00*         (2006.01)
    *B23D 47/02*         (2006.01)

(58) Field of Classification Search
    USPC .......... 83/859, 860, 100, 162–167; 242/672,
                            242/678; 248/672, 678, 346.5;
                  30/383–388, 390, 391; 125/13.01, 21;
                                          451/541
    See application file for complete search history.

(56) References Cited

U.S. PATENT DOCUMENTS 6,488,256 B1 * 12/2002 Chang ..................... 248/670
7,234,243 B2 *  6/2007 Tam et al. ................. 30/393
8,201,337 B2 *  6/2012 Tam et al. ................. 30/393

FOREIGN PATENT DOCUMENTS

| DE | 195 41 667 A1 | 8/1996 |
| DE | 198 44 807 A1 | 4/2000 |
| DE | 10 2004 035 868 A1 | 2/2006 |
| DE | 20 2005 004 316 U1 | 8/2006 |
| RU | 46833 U1 | 7/2005 |
| SU | 813080 A1 | 3/1981 |

* cited by examiner

PORTABLE, HANDHELD TOOL HAVING A FLOOR PLATE

TECHNICAL AREA

The invention relates to a floor plate, in particular for portable, handheld tools with a combustion engine.

PRIOR ART

Portable, handheld tools with combustion engine are sufficiently known in prior art. For example, DE 28 06 107 A1 has become known, and discloses a tool with a combustion engine, in which a floor plate is provided with air inlet holes. The tank of the tool is placed on this floor plate and connected with the latter, and as a result is definitely exposed to outer influences, for example flying sparks, so that it must be specially protected. For example, double-walled tanks are known from prior art for protecting the tank contents.

A floor plate configuration has further become known in which a very intricate floor plate design is provided. This floor plate configuration provides for the incorporation of a tank that must be double-walled to be sufficiently safeguarded. Also provided is another spill plate, the objective of which is to catch incandescent particles, so that they do not penetrate into the tank. However, the incandescent particles are not removed right away. While holes are present in the floor plate, they can only become active upon impact and deflection. However, since a collar is present, the particles and sparks are held back above the sheet. In addition, the spill plate is designed in such a way that not all particles can be retained. Further, the known spill plate does not exhibit the desired properties with respect to affording protection against sharp rocks and the like, along with providing the desired level of stiffening.

DESCRIPTION OF THE INVENTION: OBJECT, SOLUTION, AND ADVANTAGES

The object of the invention is to provide a floor plate, in particular for portable, handheld tools with a combustion engine, which ensures the removal of particles, and at the same time is improved with respect to furnishing protection against mechanical/dynamic loads, such as those encountered during the impact of sharp rocks, and with respect to stiffening properties.

The invention here provides that the at least one edge of an opening exhibits an element that projects at an inclined angle, or that the element protrudes from the edge, wherein the element serves as a baffle plate, in particular for incandescent or hot particles. The design of the openings advantageously reduces the weight of the floor plate, wherein the stiffness is increased at the same time by pulling up or beading the edge.

The floor plate is here advantageously designed with an essentially flat surface having an outer, continuous edge, and is provided with at least one opening with a related edge and a second opening with a related edge. To increase the stiffness of the floor plate, at least the continuous outer edge of the floor plate and/or the edge of at least one opening is at least sectionally beaded or pulled up.

To allow the element serving as a baffle plate to effectively remove incandescent or hot particles or sparks through an opening, the projecting element protrudes at an inclination over the at least one opening. As a result, the sparks or particles are removed directly with the airflow through the opening, or deflected upon colliding with the element and then diverted through the opening.

The element has an angle α relative to the plane of the floor plate of between 80° and 20°, preferably of 45°.

The floor plate preferably consists of metal, such as sheet metal, wherein the cutting process and forming process can here advantageously take place in a single operation, for example in a progressive die. It makes sense for the floor plate to be made out of sheet steel, so that it can satisfy the requirements placed on the floor plate in terms of strength and life. In like manner, aluminum or another light metal can be used to further reduce the weight.

In another exemplary embodiment, the floor plate is made out of plastic, in particular for weight considerations. It is especially advantageous for the floor plate to be comprised of carbon-reinforced plastic. This yields both a reduction in weight and an elevated stiffness. An especially heat-resistant material is here used.

According to the invention, it is also especially advantageous for the floor plate to be coated. In this case, the coating can be selected in such a way as to achieve an improved cooling and/or extinguishing of incandescent particles.

Additional advantageous embodiments and effects can be gleaned from the features of the specification and subclaims.

BRIEF DESCRIPTION OF THE DRAWINGS

The invention will be explained in greater detail below based on an exemplary embodiment using the drawings. The purely diagrammatic depictions show.

PREFERRED EMBODIMENT OF THE INVENTION

Figure 1:
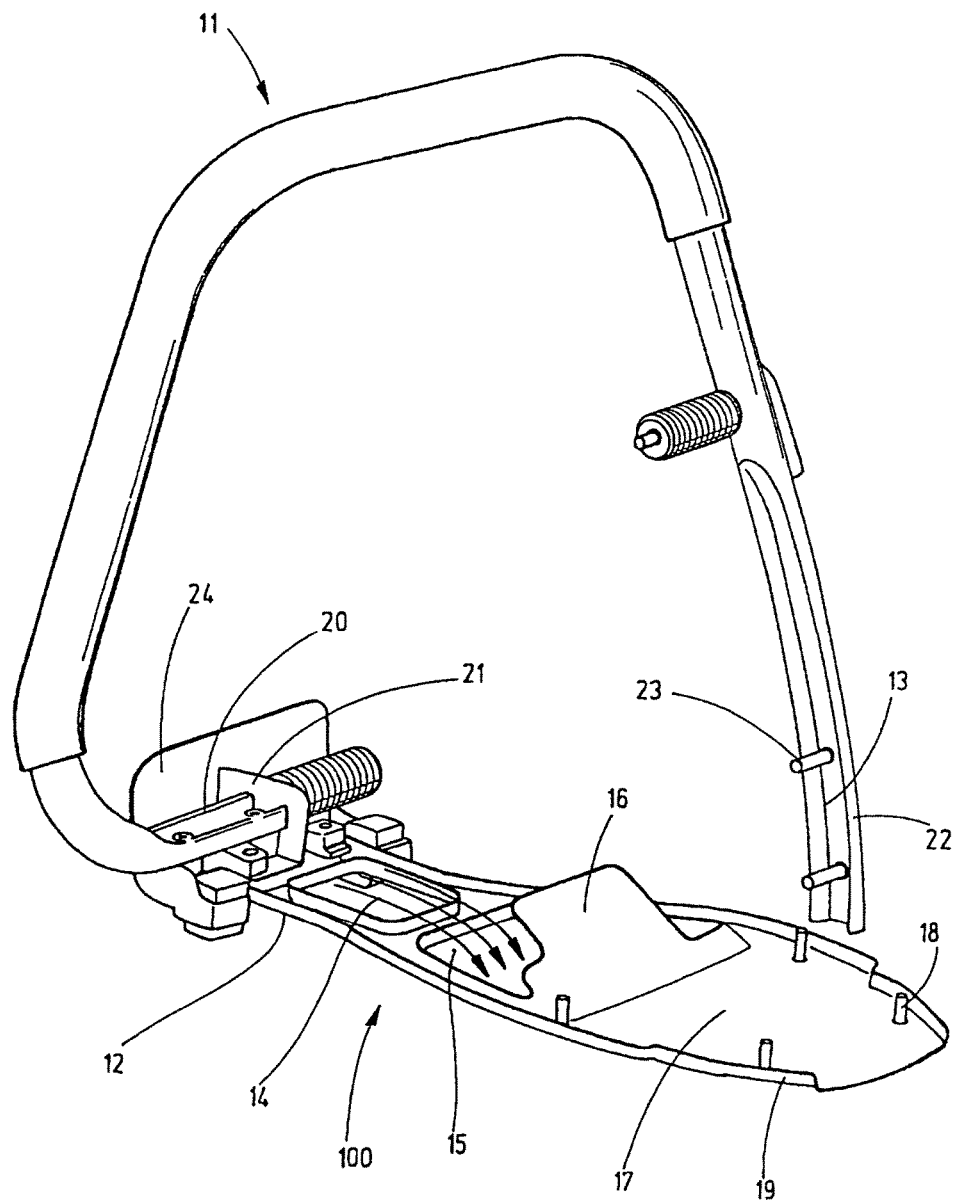
FIG. 1 a perspective view of a floor plate with a handle strap element.

FIG. 1 presents a diagrammatic view of a floor plate 100, in particular for portable, handheld tools, such as a motor saw, etc., however the latter is not shown and described here in any greater detail. A handle strap element 11 can be connected with the floor plate 100. The handle strap element 11 can here be joined with the floor plate 100 in a front area of the tool provided in an area 13, wherein it is guided laterally in the area of the floor plate 100, so that the one end area 20 of the handle strap element 11 engages into a receptacle 21 secured to the floor plate 100. The other end 22 of the handle element is preferably designed to connect in area 13 with a work tool housing (not shown) or directly and indirectly with the floor plate 100. Only the attachment elements 23 for this purpose are discernible.

The floor plate 100 is connected at its rear end in proximity to an essentially flat area 12 with a high edge or surface 24. Among other things, the latter is used to connect to the housing (not shown). In addition, the receptacle 21 and a mount for the handle strap element 11 are provided on the essentially flat area 12 of the floor plate 100. In addition, the floor plate 100 has an opening 14 used for weight reduction purposes. Provided next to the opening 14 is another opening 15, which essentially takes up the entire width of the floor plate 100, wherein yet another respective web of material for increasing the stiffness remains at the edges of the floor plate 100.

An element 16 placed at an upward incline is provided at the front edge of the opening 15, preferably fashioned out of the material of the floor plate 100, and in the drawing is depicted at the top front, and is in a built-in state toward the rear, i.e., facing a work tool member like a chain saw chain or cutoff wheel, set up toward the top and front at an angle most preferably of 45° relative to the plane of the floor plate 100. This element 16 is used to route flying sparks from inside the casing from the back out of area 12 toward the front through the opening 15 and outside the housing. The element 16 here also serves as a baffle plate, so that the sparks bounce off the element 16 and are diverted outside through the opening 15.

Situated in front of the opening 15 and protected by the element 16 is an essentially flat area 17, in which a tank (not shown) can be arranged. Arranging the tank in the direction in which the sparks fly behind the element 16 in area 17 protects the tank against flying sparks, and makes it possible to make it lighter, for example since it no longer must be double-walled or have thicker walls. Also provided for securing the tank are attachment elements 18. In order to further enhance stiffness while still keeping the weight of the floor plate low, the edges 19 are pulled up and beaded on the sides of the floor plate 100, while the edges 14a, 15a are pulled up and beaded in the area of the openings 14 and 15, making it possible to achieve a higher bending stiffness for the floor plate 100. This lowers the cost of production, while simultaneously increasing the stiffness, as in the case of a tubular frame or square frame.

Figure 2:
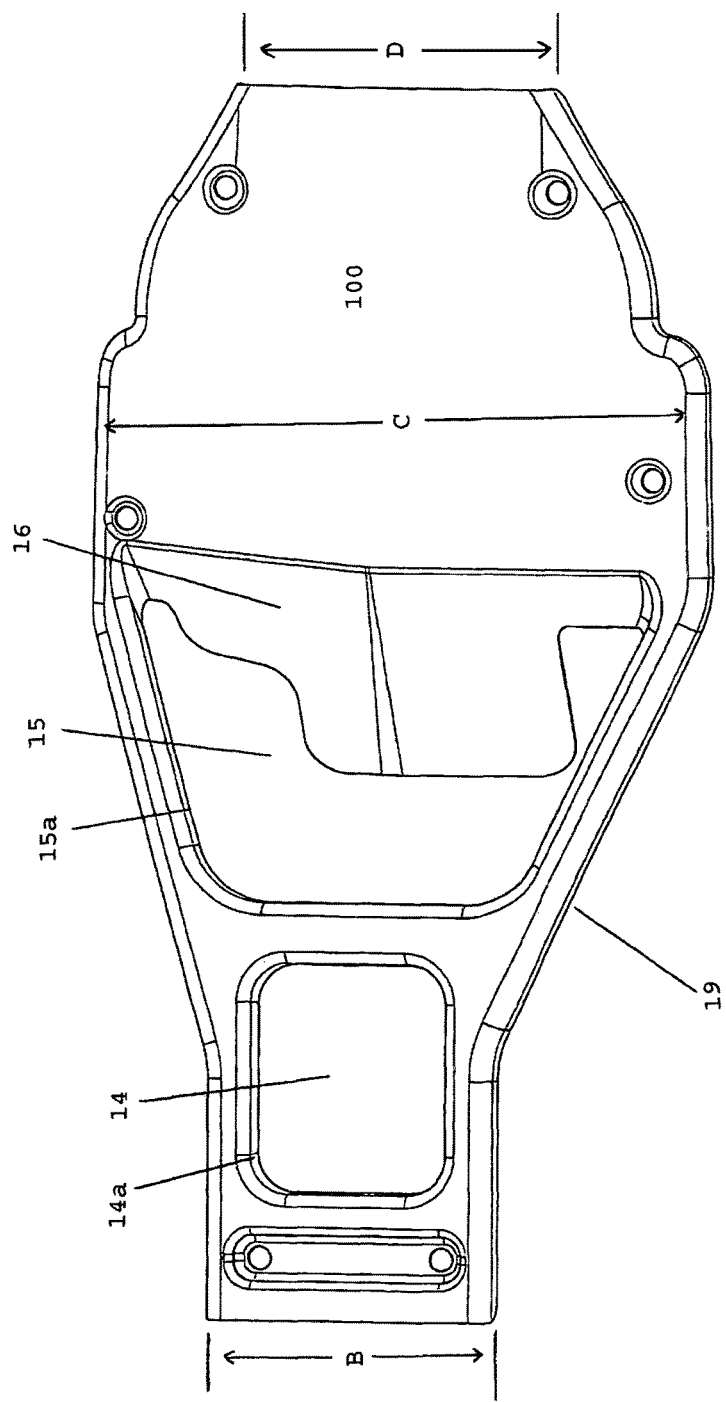
FIG. 2 a plan view of a floor plate.

FIG. 2 presents a diagrammatic, plan view of the floor plate 100 (without the attachment elements 18), wherein the floor plate 100 is viewed from the rear side (area 12) at the bottom of FIG. 2 to the front side at the top of FIG. 2, the front side including the receiving area 17 of the tank. As evident here, the opening 14 along with the opening 15 are each provided with the pulled-up edge 14a, 15a, to stiffen and hence reinforce the floor plate 100 in this area. Also evident is that the continuous edge 19 is stiffened in almost its entirety, with the exception of the front area, as the result of pulling up the edge. The element 16 with its inclination allows the sparks flying toward the element 16 to be diverted toward the front down, through the opening 15 and out of the housing, away from the tank. The upper edge of the element 16 is stepped, so that the element 16 in the central area, is at the highest point, while the edges are somewhat lower in height. As evident, both FIG. 1 and FIG. 2 show this stepped configuration with a step on the left side, and essentially no step on the other, opposing side.

Figure 3:
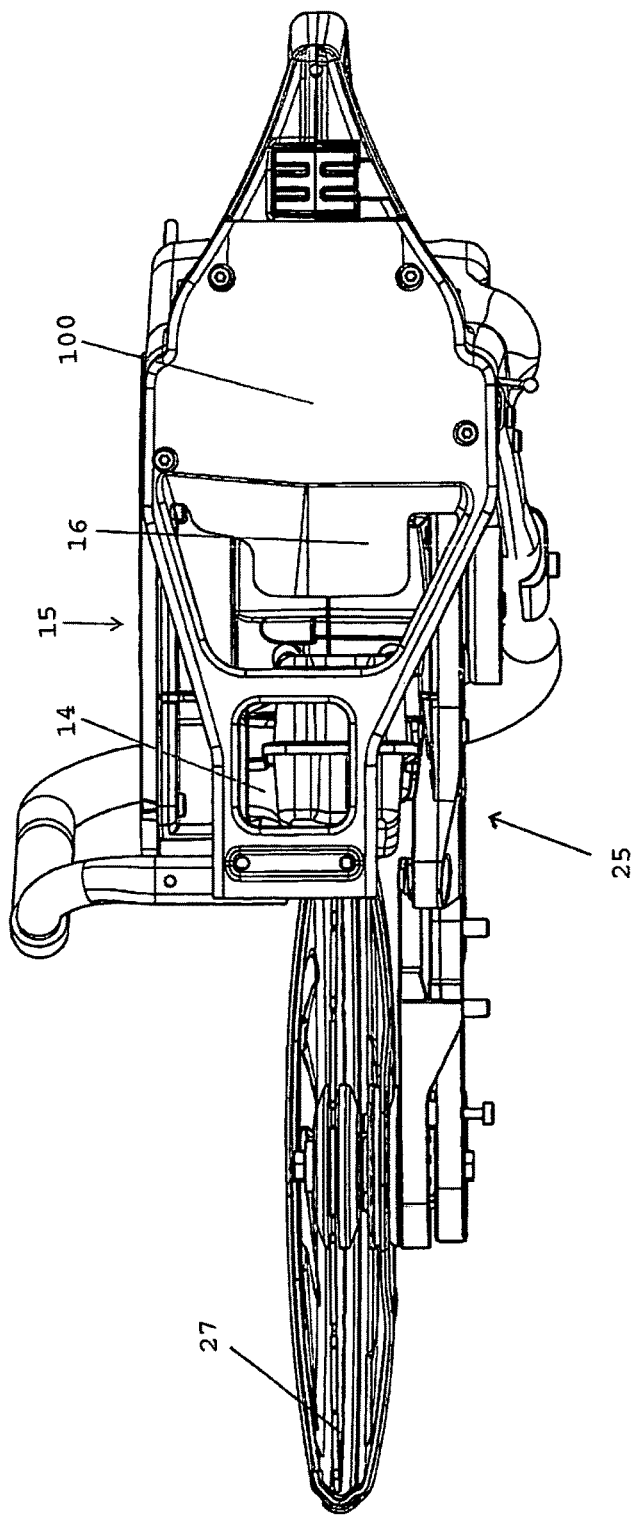
FIG. 3 a plan view of a floor plate of a tool.

FIG. 3 shows the floor plate 100 in an application of a tool 25 including an operating portion 27 and a conventional drive (not shown) that drives the operating portion 27, wherein the floor plate 100 can be discerned from below. Clearly evident are the openings 14 and 15, and the element 16 that serves as the baffle plate. The tool 25 is preferably an abrasive cutting-off machine.

FIG. 2 shows the floor plate 100 as viewed from below. Clearly evident are the openings 14 and 15, along with the element 16 that serves as the baffle plate. The shape of the floor plate 100 is very readily discernible from FIG. 2. The floor plate 100 has a roughly constant beginning width B in the area of the opening 14, which starts to expand at about the height of the opening 14 as viewed in FIG. 2. The width of the floor plate 100 expands over the height of the opening 15, and again assumes a constant width C after the opening 15. Hence, the opening 15 has an increasing width, wherein the width of the opening 15 is greater on the baffle plate 16 side than on the opposing side.

The width of the floor plate 100 then tapers off again to value D as viewed on the upper side of FIG. 2. This decrease in width to value D can be incremental, as depicted on FIG. 2, or continuous in another exemplary embodiment. The width B is advantageously smaller than width C and width D, wherein width D can also be smaller than or equal to width C, depending on the exemplary embodiment.

FIG. 2 shows the advantageous frame-like shape of the floor plate 100, which is attained by forming an edge 19 that is essentially nearly continuous, and stiffened at least on one side or even bilaterally by means of pulled-up or beaded edges. The formation of the openings 14, 15 further yields a reduction in weight to go along with the stiffening.

The floor plate 100 is advantageously made out of a sheet metal or plastic material. The sheet metal can here advantageously be stamped, making it possible, in addition to tailoring the sheet metal, to simultaneously achieve a shaping process that yields the elevated edge areas and/or the elevated baffle plate. For example, steel can be selected as the material. Preferably a carbon-reinforced plastic can be selected as the plastic material.

It is further advantageous for the floor plate 100 or at least partial areas thereof, for example the element 16 that serves as the baffle plate, to be coated, thereby yielding an improved or safe removal of sparks or particles by reducing or avoiding adhesion to these coated regions. For example, such a coating can result in the sparks or incandescent particles being effectively dissolved from the surface of the element 16 acting as the baffle plate. Such a coating can advantageously result in a rapid cooling, since it has a high specific heat, and as such can absorb a high level of thermal energy.

REFERENCE LIST

11 Handle strap
12 Area
13 Area
14 Opening
14a Edge of opening
15 Opening
15a Edge of opening
16 Element
17 Flat area
18 Attachment element
19 Edge
20 End area
21 Receptacle
22 End
23 Attachment element
24 Front area
25 Tool
100 Floor plate

The invention claimed is:
1. A portable, handheld tool comprising:
an operating portion configured to operate on an object, the operating portion disposed in an operating plane;
a drive that drives the operating portion in the operating plane; and
a floor plate mounted to the operating portion, the floor plate including:
an essentially flat surface, the essentially flat surface having a continuous outer edge, a back area and a front area, the back area and the front area being aligned along a longitudinal axis of the floor plate, the front area is positioned at one end of the floor plate along the longitudinal axis and the back area is positioned at an opposite end of the floor plate along the longitudinal axis; and one or more openings, each of the one or more openings having an edge, the edge of at least one opening of the one or more openings comprises a baffle plate that projects at an inclined angle over the at least one opening, the baffle plate configured to route flying sparks projecting from the operating portion operating on the object in the operating plane at the back area of the essentially flat surface, wherein the back area is positioned facing an acute angle side of the inclined angle and the baffle plate includes a major surface projecting towards the back area according to the inclined angle and extending in a plane transverse to the longitudinal axis, and the at least one opening whose edge has the baffle plate is aligned along the longitudinal axis between the back area and the front area, the at least one opening, the back area, the front area and the operating plane are positioned on the longitudinal axis so that the sparks are routed through the at least one opening whose edge has the baffle plate.

2. The portable, handheld tool according to claim 1, wherein the inclined angle measures between 80° and 20°.

3. The portable, handheld tool according to claim 1, wherein at least one of the continuous outer edge of the floor plate and the edge of at least one opening of the one or more openings are beaded or pulled up in one or more sections.

4. The portable, handheld tool according to claim 1, wherein the continuous outer edge of the floor plate and the edge of at least one opening of the one or more openings are beaded or pulled up in one or more sections.

5. The portable, handheld tool according to claim 4, wherein the continuous outer edge of the floor plate is partially beaded or pulled up, wherein at least one of a front edge area and a back edge area of the continuous outer edge is not beaded or pulled up.

6. The portable, handheld tool according to claim 1, wherein the floor plate consists of metal.

7. The portable, handheld tool according to claim 1, wherein the floor plate consists of plastic.

8. The portable, handheld tool according to claim 1, wherein the floor plate is coated on one or both sides.

9. The portable, handheld tool according to claim 1, wherein the tool is a saw and the operating portion is a saw blade.

10. A portable, handheld tool comprising:
an operating portion configured to operate on an object, the operating portion disposed in an operating plane;
a drive that drives the operating portion in the operating plane; and
a floor plate mounted to the operating portion, the floor plate including:
an essentially flat surface, the essentially flat surface having a continuous outer edge, a back area and a front area, the back area and the front area being aligned along a longitudinal axis of the floor plate, the front area is positioned at one end of the floor plate along the longitudinal axis and the back area is positioned at an opposite end of the floor plate along the longitudinal axis; and
one or more openings, each of the one or more openings having an edge, the edge of at least one opening of the one or more openings comprises a baffle plate that projects at an inclined angle over the at least one opening, the baffle plate configured to route flying sparks projecting from the operating portion operating on the object in the operating plane at the back area of the essentially flat surface, wherein the back area is positioned facing an acute angle side of the inclined angle and the baffle plate includes a major surface projecting towards the back area according to the inclined angle and extending in a plane transverse to the longitudinal axis, the at least one opening whose edge has the baffle plate is aligned along the longitudinal axis between the back area and the front area, the at least one opening, the back area, the front area and the operating plane are positioned on the longitudinal axis so that the sparks are routed through the at least one opening whose edge has the baffle plate, and the essentially flat surface has a width that is narrower in the back area than in the front area.

* * * * *